United States Patent
Sawyers et al.

(10) Patent No.: US 8,732,348 B2
(45) Date of Patent: May 20, 2014

(54) ELECTRONIC DEVICE PERFORMANCE LEVEL INDICATOR AND METHOD

(75) Inventors: Thomas P. Sawyers, Houston, TX (US); Richard S. Lin, Houston, TX (US)

(73) Assignee: Hewlett-Packard Development Company, L.P, Houston, TX (US)

( * ) Notice: Subject to any disclaimer, the term of this patent is extended or adjusted under 35 U.S.C. 154(b) by 1963 days.

(21) Appl. No.: 11/491,642

(22) Filed: Jul. 24, 2006

(65) Prior Publication Data

US 2008/0126818 A1    May 29, 2008

(51) Int. Cl.
*G06F 13/28*    (2006.01)
*G06F 1/26*    (2006.01)

(52) U.S. Cl.
USPC .............................. 710/19; 713/300

(58) Field of Classification Search
USPC .............................. 710/19; 320/127
See application file for complete search history.

(56) References Cited

U.S. PATENT DOCUMENTS

| | | | |
|---|---|---|---|
| 5,166,854 A * | 11/1992 | Morishige | 361/91.6 |
| 5,187,425 A * | 2/1993 | Tanikawa | 320/138 |
| 5,365,221 A * | 11/1994 | Fennell et al. | 340/636.15 |
| 5,477,129 A * | 12/1995 | Myslinski | 340/636.1 |
| 6,259,371 B1 * | 7/2001 | Chang | 340/659 |
| 6,828,760 B2 * | 12/2004 | Massey et al. | 320/127 |

\* cited by examiner

*Primary Examiner* — Titus Wong

(57) ABSTRACT

An electronic device comprises a performance level indicator configured to determine an operational performance level for the electronic device based on a power capability of a power adapter coupled to the electronic device at least while the electronic device is non-operational.

20 Claims, 3 Drawing Sheets

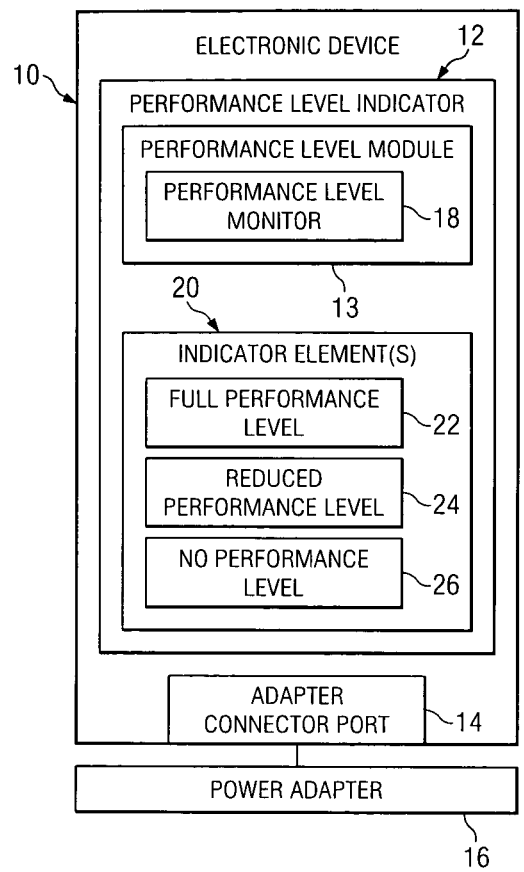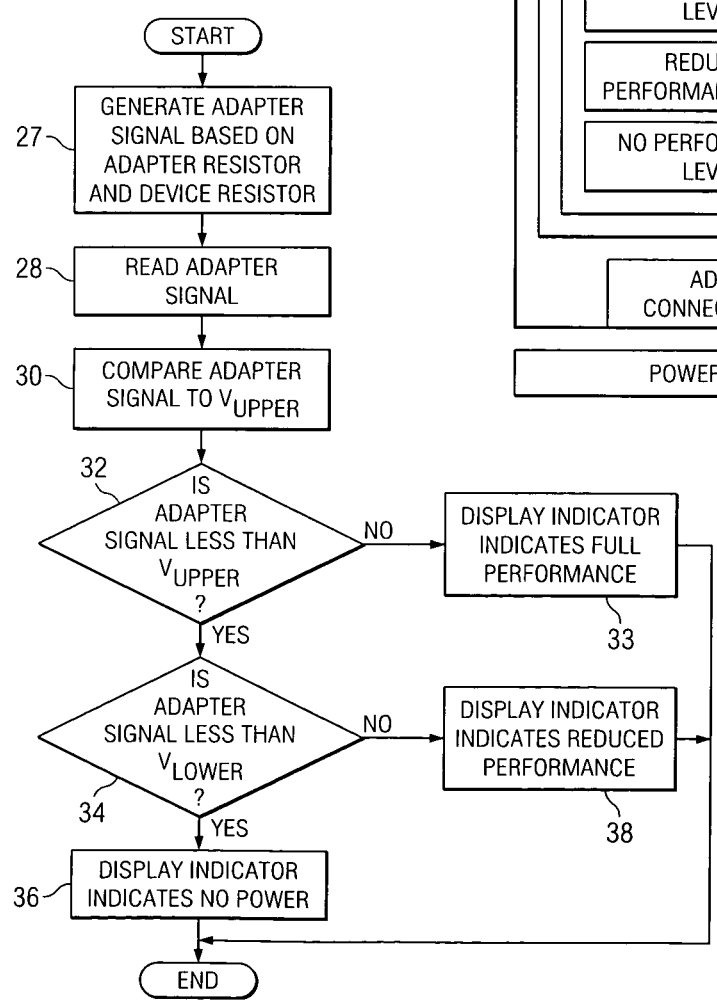

ELECTRONIC DEVICE PERFORMANCE LEVEL INDICATOR AND METHOD

BACKGROUND OF THE INVENTION

Power adapters of different power ratings (e.g., 35, 50, 65, and 90 watt adapters) having the same plug size enable such power adapters to be interchangeably connected to different electronic devices (e.g., computer devices and/or docking stations). However, a particular adapter may be unable to provide sufficient power to enable the electronic device to operate at a full or even reduced performance level. Further, in order to determine whether the adapter has sufficient power to operate the computer device at a full or even a reduced performance level, a user must wait until the computer boots before receiving any indication of a performance issue relating to the power adapter.

BRIEF DESCRIPTION OF THE DRAWINGS

For a more complete understanding of the present invention, and the objects and advantages thereof, reference is now made to the following descriptions taken in connection with the accompanying drawings in which:

FIG. 1 is a block diagram illustrating an electronic device employing an embodiment of a performance level indicator to advantage in accordance with the present invention;

FIG. 2 is a flow diagram illustrating an embodiment of a performance level indicator method in accordance with the present invention;

DETAILED DESCRIPTION OF THE DRAWINGS

Figure 3:
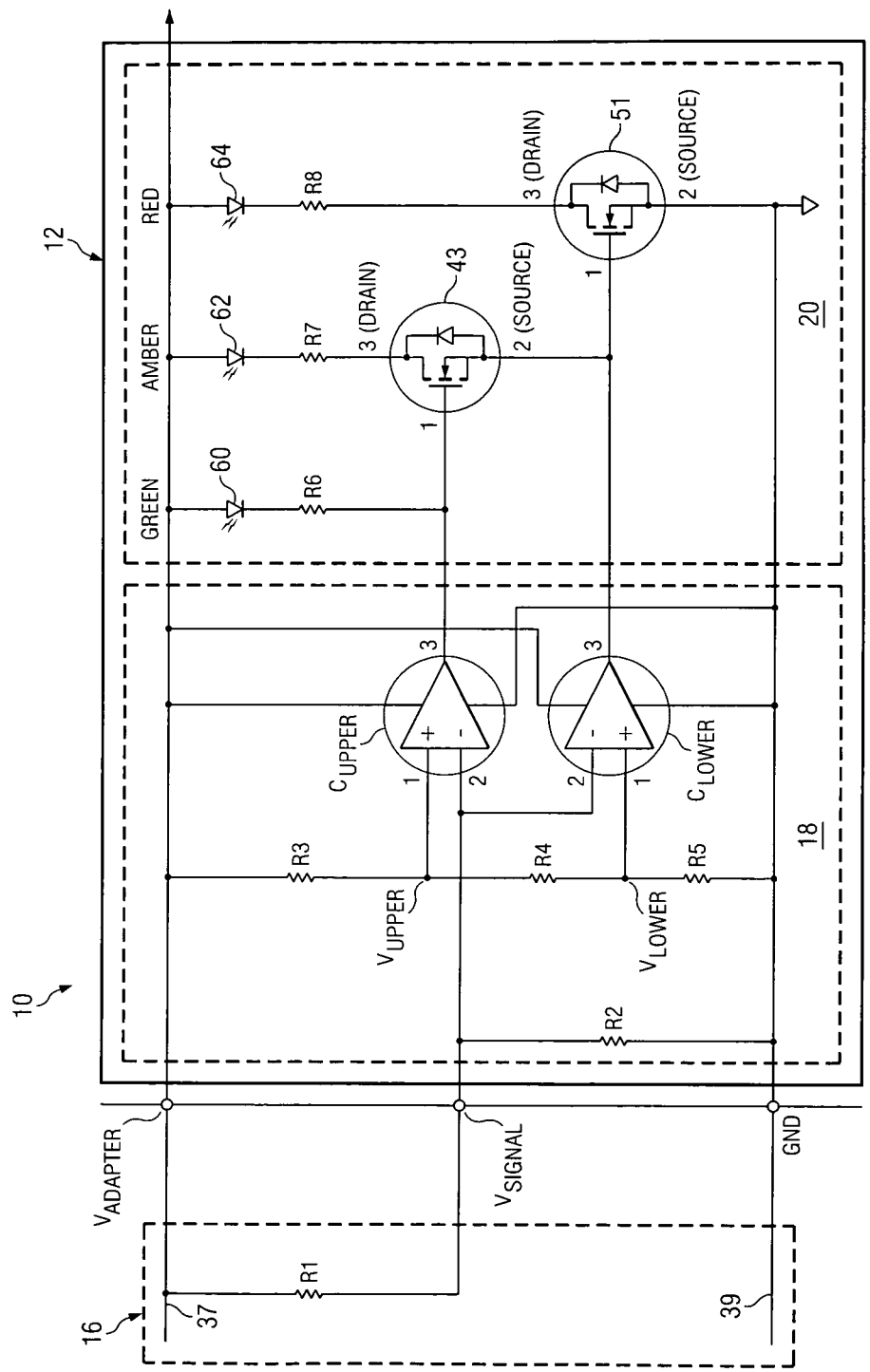
FIG. 3 is a circuit diagram illustrating an embodiment of a performance level indicator in accordance with the present invention.

The preferred embodiments of the present invention and the advantages thereof are best understood by referring to FIGS. 1-5 of the drawings, like numerals being used for like and corresponding parts of the various drawings.

FIG. 1 is a diagram illustrating an electronic device 10 employing an embodiment of a performance level indicator 12 to advantage in accordance with the present invention. Performance level indicator 12 provides an indication, in response to connecting of a power adapter 16 to electronic device 10, whether electronic device 10 may be operated or powered by power adapter 16 and/or achieve an obtainable performance level for electronic device 10 based on the connected power adapter 16 in conjunction with electronic device 10 regardless of whether electronic device is operational or non-operational (e.g., powered on or powered off). Preferably, the indication associated with the performance level is provided to a user without perceptual delay in response to coupling of power adapter 16 to electronic device 10 (e.g., within a few milliseconds after power adapter 16 is coupled to electronic device 10). Electronic device 10 may comprise any type of electronic device such as, but not limited to, a computing device, personal digital assistant, a cellular telephone, camera, or a music/media player. In the embodiment illustrated in FIG. 1, electronic device 10 comprises a power adapter connector port 14 for coupling power adapter 16 thereto. Power adapter 16 may comprise any type of device for converting a type of power supply (e.g., converting an alternating current (AC) power supply to a direct current (DC) power supply, or vice versa) and/or converting a particular voltage level to another voltage level (e.g., a reduced or lower voltage level).

Preferably, performance level indicator 12 is powered by power adapter 16 and is configured to be operable independent of other systems and/or applications of electronic device 10 (e.g., operable independent of whether electronic device 10 is operational ("on") or non-operational ("off")). Thus, embodiments of the present invention enable an indication of whether electronic device 10 may be operated or powered by a connected power adapter 16 and/or achieve an obtainable performance level for electronic device 10 based on the connected power adapter 16 with or without electronic device being "on" (e.g., while electronic device 10 is non-operational such as prior to a user turning on or operating electronic device 10).

In the embodiment illustrated in FIG. 1, electronic device 10 comprises a performance level module 13 which may comprise hardware, software, or a combination thereof. In the embodiment illustrated in FIG. 1, performance level module 13 comprises a performance level monitor 18 for determining an operational performance level of electronic device 10 that may be obtained based on the connected power adapter 16. As used herein, operational performance level is at least a minimum level at which electronic device 10 operates. Performance level indicator 12 also comprises indicator element(s) 20 for outputting/indicating the obtainable performance level of electronic device 10 based on the connected power adapter 16. In the embodiment illustrated in FIG. 1, indicator element(s) 20 comprise a full performance level indicator 22 (e.g., when power adapter 16 is capable of providing a power level to enable electronic device 10 to operate at its full performance level), a reduced performance level indicator 24 (e.g., when power adapter 16 provides a power level to enable electronic device 10 to operate at a performance level less than its the full performance level capability), and a no performance/no power level indicator 26 (e.g., when power adapter 16 is unable to provide an adequate amount of power to operate electronic device 10 even at a reduced performance level). It should be understood that indicator element(s) 20 may comprise an indication of a greater or fewer number of performance levels (e.g., a performance level indicator specifying operation at 60%, 70%, 80%, etc., of a full performance level). In some embodiments of the present invention, indicator element(s) 20 comprises a light emitting diode(s) (LEDs). However, it should be understood that other types of indicators, visual and/or audio, may be used.

FIG. 2 is a flow diagram illustrating an embodiment of a performance level indicator method in accordance with the present invention. The method begins at block 27, where an adapter signal is generated based on adapter resistor $R_1$ and electronic device 10 resistor $R_2$. The method continues at block 28, where performance level monitor 18 reads a voltage or other signal value generated by power adapter 16 in response to power adapter 16 being connected to electronic device 10. At block 30, performance level monitor 18 compares the read voltage/signal value associated with power adapter 16 to a predetermined voltage/signal representative of the minimum voltage required for operation of electronic device 10 at a full performance level, hereinafter referred to as $V_{upper}$. At decisional block 32, a determination is made whether the read voltage/signal value associated with power adapter 16 is equal to or greater than $V_{upper}$. If it is determined that the read voltage/signal value associated with power adapter 16 is equal to or greater than $V_{upper}$, the method proceeds to block 33, where full performance level indicator 22 (FIG. 1) is activated to indicate to a user that electronic device 10 is operable at its full performance level using the connected power adapter 16. If, at decisional block 32, a determination is made by performance level monitor 18 (FIG. 1) that the read voltage/signal value associated with power adapter 16 is less than $V_{upper}$, the method proceeds to decisional block 34, where a determination is made whether the read voltage/signal value associated with power adapter 16 is lower than a predetermined voltage representative of a minimum value that that would enable electronic device 10 to operate at least at a reduced performance level, hereinafter referred to as $V_{lower}$. If it is determined at decisional block 34 that the read voltage/signal value associated with power adapter 16 is less than $V_{lower}$, the method proceeds to block 36, where no performance level indicator 26 (FIG. 1) is activated to indicate to a user that electronic device 10 is inoperable based on power supplied by the particular power adapter 16 connected to electronic device 10. If at decisional block 34 it is determined that the read voltage/signal value associated with power adapter 16 is not less than $V_{lower}$, the method proceeds to block 38, where reduced performance level indicator 24 is activated to indicate to a user that electronic device 10 is operable at a reduced performance level based on the power supplied by the connected power adapter 16. Thus, because performance level indicator 12 is operable via power supplied from power adapter 16, performance level indicator 12 is configured to indicate to a user, even prior to the user turning on the electronic device 10, whether the electronic device 10 may be operated using the connected power adapter 16 and, if so, whether the electronic device 10 may be operated at its full performance level or at a reduced performance level. However, it should be understood that in some embodiments of the present invention, performance level indicator 12 is able to indicate and/or otherwise operate while electronic device 10 is operating or "on."

FIG. 3 is a circuit diagram illustrating an embodiment of a performance level indicator 12 in accordance with the present invention. It should be understood, however, that FIG. 3 illustrates one particular embodiment of performance level indicator 12 and that other configurations of performance level indicator 12 may be used for indicating whether power adapter 16 enables electronic device to operate at a full performance level, a reduced performance level, or whether power adapter 16 is unable to provide power for operation of electronic device 10. In the embodiment illustrated in FIG. 3, power adapter 16 provides a voltage $V_{adapter}$ to electronic device 10. Power adapter 16 comprises a resistor $R_1$ having a fixed value corresponding to a particular rated power adapter 16. For example, power adapters 16 having different power ratings (e.g., 50 watt, 65 watt, 90 watt, etc.) are configured having different predetermined $R_1$ values. In the embodiment illustrated in FIG. 3, performance level monitor 18 comprises a resistor $R_2$ having a fixed resistor value corresponding to a particular power level required for operating electronic device 10 at its full performance level. For example, if electronic device 10 requires at least a 65 watt power adapter to operate at its full performance level, the value of $R_2$ is configured to be equal to (defined as being equal to or approximately equal to) resistor value $R_1$ for a 65 watt power adapter. Thus, in operation, in response to power adapter 16 being connected to electronic device 10, a voltage divider circuit is completed (e.g., a circuit from bus terminal 37 to ground 39) such that $V_{signal}$ (e.g, the output voltage from the divider circuit) is a predetermined percentage of $V_{adapter}$. Accordingly, when $R_1$ is equal to $R_2$, $V_{signal}$ is approximately one-half of $V_{adapter}$.

In the embodiment illustrated in FIG. 3, performance level indicator 18 further comprises resistors $R_3$, $R_4$, and $R_5$, a comparator $C_{upper}$ and a comparator $C_{lower}$ to determine whether power adapter 16 enables operation of electronic device 10 either at a full performance level, a reduced performance level, or whether adapter 16 is unable to provide a sufficient power level for operating electronic device 10. In the embodiment illustrated in FIG. 3, resistors $R_3$, $R_4$, and $R_5$ are disposed in series forming a voltage divider extending between bus terminal 37 and ground 39 to provide voltage reference points $V_{upper}$ and $V_{lower}$ for input into comparators $C_{upper}$ and $C_{lower}$, respectively. In the embodiment illustrated in FIG. 3, values $R_3$, $R_4$, and $R_5$ are predetermined such that $V_{upper}$ (the voltage representative of a full performance level) will be a predetermined percentage of $V_{adapter}$ that is greater than a predetermined percentage of $V_{lower}$ (the minimum voltage level representative of a reduced performance level).

In the embodiment illustrated in FIG. 3, indicator element 20 comprises light sources 60, 62 and 64 and a pair of N-channel field effect transistors (FETs) 43 and 51. In the embodiment illustrated in FIG. 3, light source 60 is green (for indicating a full performance level when power adapter 16 is connected to electronic device 10), light source 62 is amber (for indicating a reduced performance level when power adapter 16 is connected to electronic device 10) and light source 64 is red (for indicating that power adapter 16 is unable to provide a power level for operating electronic device 10); however, it should be understood that light sources 60, 62 and 64 may be otherwise colored.

Preferably, $R_1$ is configured having a predetermined value such that $V_{signal}$ is greater than $V_{upper}$ and $V_{lower}$ when power adapter 16 enables electronic device 10 to operate at a full performance level. Thus, in operation, in response to power adapter 16 being connected to electronic device 10, input at pins 1 and 2 of comparator $C_{upper}$, namely $V_{upper}$ and $V_{signal}$ respectively, are compared. If $V_{signal}$ is greater than $V_{upper}$, output of comparator $C_{upper}$ at pin 3 will be LO (e.g., short to ground through comparator $C_{upper}$), thereby drawing current through resistor R6 to activate light source 60 and indicating that electronic device 10 is operable at a full performance level based on power supplied by power adapter 16. Further, in this example, the output (pin 3) of $C_{upper}$ is coupled to the gate (pin 1) of FET 43 and will also be LO. Additionally, the input at pins 1 and 2 of comparator $C_{lower}$, namely, $V_{lower}$ and $V_{signal}$ respectively, are compared. If $V_{signal}$ is greater than $V_{lower}$, output of comparator $C_{lower}$ at pin 3, which is coupled to the source (pin 2) of FET 43 and to the gate (pin 1) of FET 51, will be LO, thereby causing a LO input to the source (pin 2) of FET 43 and to the gate (pin 1) of FET 51. Accordingly, because the gate (pin 1) of FET 43 is LO and the source (pin 3) of FET 51 is grounded, FET 43 and FET 51 are switched off, thereby preventing current from being drawn through resistors $R_7$ and $R_8$, thus maintaining indicators 62 and 64 in a non-illuminated condition, respectively. Thus, in this configuration, in response to connecting power adapter 16 to electronic device 10, the user is alerted that power adapter 16 enables electronic device 10 to operate at a full performance level by illuminating light source 60 only.

Further, $R_1$ is preferably configured having a predetermined value such that $V_{signal}$ is less than $V_{upper}$ and $V_{lower}$ if power adapter 16 is unable to provide a power level for operating electronic device 10. Thus, in this example, the output (pin 3) of comparators $C_{upper}$ and $C_{lower}$ is HI. Accordingly, no current is drawn through resistor $R_6$, thereby preventing light source 60 from being illuminated. Further, in this example, the input from $C_{upper}$ at the gate (pin 1) of FET 43 and the source (pin 3) of FET 43 from $C_{lower}$ is HI, thereby causing FET 43 to switch off to prevent current from being drawn through resistor $R_7$ and illuminating light source 62. The input from $C_{lower}$ at the gate (pin 1) of FET 51 is HI and the drain (pin 3) of FET 51 is pulled to ground 39, thereby causing FET 51 to be switched on, causing the value at the source (pin 2) of FET 51 (ground) to be passed to drain (pin 3), and drawing current across resistor $R_8$ to illuminate light source 64 to indicate that power adapter 16 is unable to provide a sufficient or any power level for operating electronic device 10.

Further, $R_1$ is preferably selected such that $V_{signal}$ is less than $V_{upper}$ and greater than $V_{lower}$ if the connected power adapter 16 is capable of providing a power level sufficient for operating electronic device 10 but at a level less than the level of power required for full performance of electronic device 10. In this example, the outputs (pin 3) of comparators $C_{upper}$ and $C_{lower}$ are HI and LO, respectively. Thus, in this state, no current is drawn through resistor $R_6$ and light source 60 is not illuminated. Further, the input at gate (pin 1) of FET 43 is HI and the source (pin 2) of FET 43 is LO, causing FET 43 to be switched on and enabling the value at the source (pin 2) of FET 43 to be passed to the drain (pin 3) of FET 43 to draw current across resistor $R_7$ to illuminate light source 62. Additionally, the input at gate (pin 1) of FET 51 is LO and the source (pin 2) of FET 51 is grounded, thereby causing FET 51 to be switched off, thereby preventing current from being drawn through resistor $R_8$ and maintaining light source 64 in a non-illuminated condition. Therefore, in response to power adapter 16 being connected to electronic device 10, the user is notified that the power adapter 16 will enable operation of computer device at a reduced performance level by illuminating light source 62 only.

Figure 4:
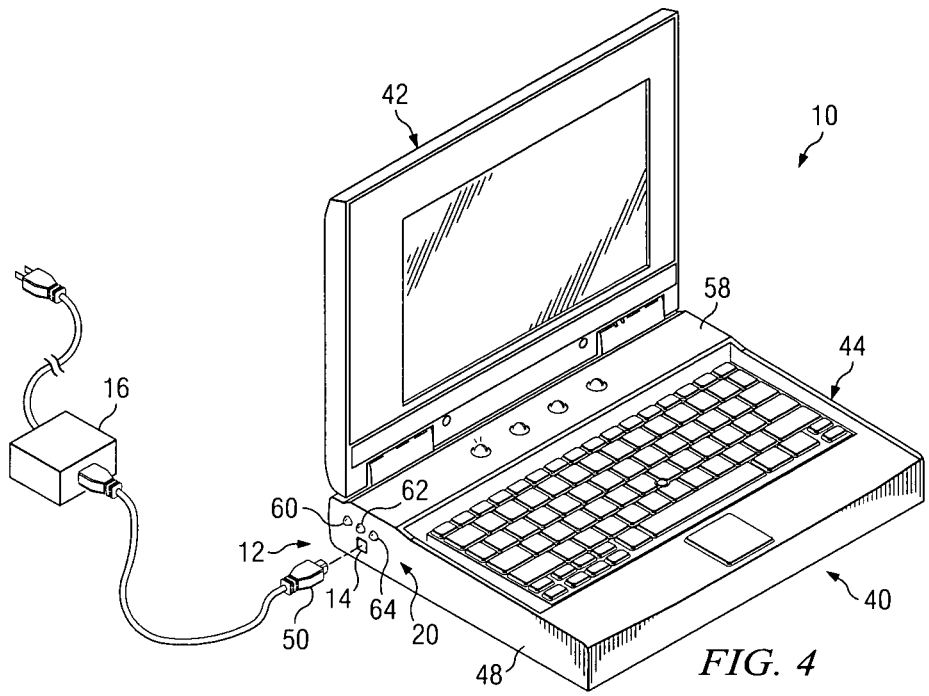
FIG. 4 is a diagram illustrating a computer device employing an embodiment of a performance level indicator to advantage in accordance with the present invention.

FIG. 4 is a diagram illustrating electronic device 10 employing an embodiment of performance level indicator 12 to advantage in accordance with the present invention. In the embodiment illustrated in FIG. 4, electronic device 10 comprises a laptop or notebook computer 40 having a display member 42 rotatably coupled to a base member 44. In the embodiment illustrated in FIG. 4, indicator elements 20 comprises light sources 60, 62 and 64 configured to display an indication for full performance, for reduced performance, and no performance, respectively, based on the power rating of a particular power adapter 16 connected to electronic device 10 (e.g., connected to electronic device 10 via a plug 50). In the embodiment illustrated in FIG. 4, light sources 60, 62 and 64 are disposed adjacent to power adapter connector port 14 on a side surface 48 of base member 44 to visually indicate the performance level of electronic device 10 based on the particular power adapter 16 connected to notebook computer 40. Preferably, indicator elements 20 are located near power adapter connector port 14 to visually indicate to the user the performance level of electronic device 10 based on the particular power adapter 16 connected to electronic device 10 (e.g., by illuminating respective light sources 60, 62 or 64). However, it should be understood that indicator elements 20 may be otherwise located (e.g., any location on base member 44 or display member 42). Further, it should be understood that performance level indicator 20 may comprise other types of indicators configured to indicate the performance level of electronic device 10 (e.g., an audio signal). In FIG. 4, three light sources 60, 62 and 64 are used to indicate three different performance levels. However, it should be understood that a greater or fewer quantity of indicators may be used (e.g., two indicators such that one indicator is used to indicate too little power and another indicator to indicate enough power to operate).

Figure 5:
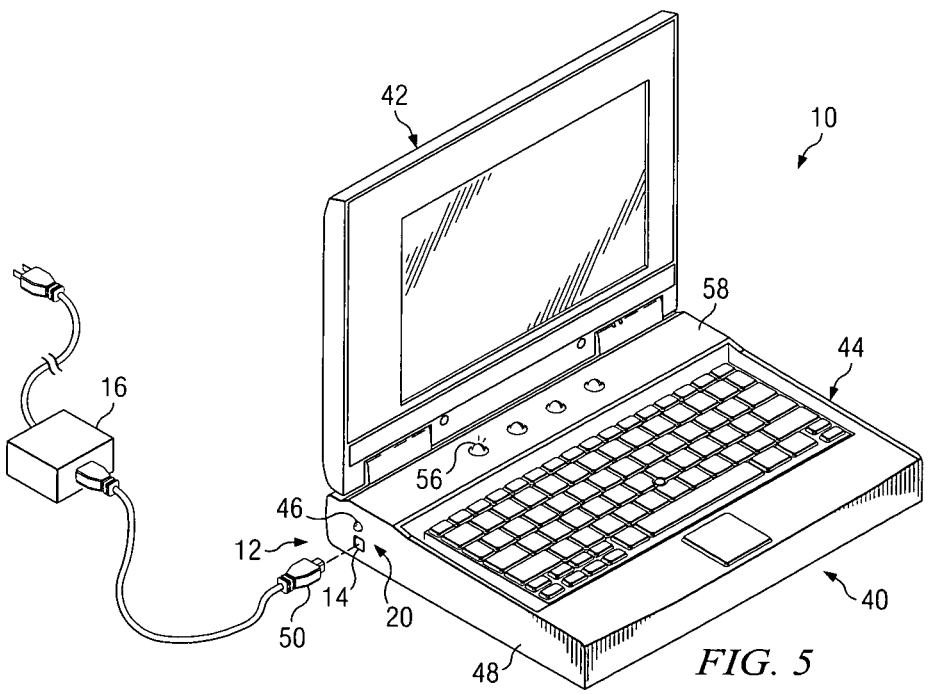
FIG. 5 is a diagram illustrating another computer device employing another embodiment of a performance level indicator to advantage in accordance with the present invention.

FIG. 5 is a diagram illustrating another embodiment of electronic device 10 employing an embodiment of performance level indicator 12 to advantage in accordance with the present invention. In the embodiment illustrated in FIG. 5, indicator element 20 comprises a single light source 46 disposed adjacent to power adapter connector port 14 on side surface 48 of base member 44 to visually indicate the performance level of electronic device 10 based on a particular power adapter 16 connected thereto. It should be understood that non-illumination of light source 46 may also be used to indicate a particular performance level of electronic device 10 corresponding to adapter 16 (e.g., if performance level monitor 18 detects a voltage from power adapter 16 indicating that the connected power adapter 16 cannot provide a sufficient level of power for operating electronic device 10, light source 46 is maintained in a non-illuminated state). Embodiments of the present invention may also be configured to utilize a variety of methods of activating light source 46 corresponding to an operating performance level of electronic device 10 based on the connected power adapter 16. For example, in some embodiments of the present invention, light source 46 is configured to be illuminated continuously to indicate a particular power level provided by adapter 16 (e.g., a full performance level) and to blink at a predetermined illumination interval and/or at a varying illumination interval to indicate a power level provided by adapter 16 that enables electronic device 10 to operate at a reduced performance level (e.g., slower blinking rate for a lower reduced performance level and a faster blinking rate for a greater reduced performance level)). In other embodiments of the present invention, light source 46 comprises a multi-color light source to enable different performance levels to be indicated by different colors (e.g., a green light indicating sufficient power for full performance, an amber light indicating sufficient power for a reduced performance level, and a red light indicating insufficient power for operating electronic device 10).

In other embodiments of the present invention, performance level indicator 20 is configured for operation as part of, or in combination with, a multi-purpose light source 56 (e.g., an LED) as illustrated in FIG. 5. For example, multi-purpose light source 56 may be used for other purposes such as, but not limited to, indicating whether electronic device 10 is powered on or powered off. Thus, in some embodiments of the present invention, light source 56 is configured to blink (e.g., at a particular illumination frequency or interval) to indicate a particular performance level of electronic device 10 and/or be configured as a multi-color light source to indicate a particular performance level of electronic device 10 when power adapter 14 is coupled thereto. In the embodiment illustrated in FIG. 5, multi-purpose light source 56 is disposed on a working surface 58 of base member 44. However, it should be understood that multi-purpose light source 56 may be otherwise located on electronic device 10 (e.g., any location on base member 44 and/or display member 42). It should also be appreciated that light source 56 may be used in combination with light source 46, instead of light source 46, in combination with light sources 60, 62 and 64 (FIG. 4), or instead of light sources 60, 62 and 64. Thus, it should be understood that a variety of combinations and/or indicating methods may be used.

Thus, embodiments of the present invention provide a performance level indicator 12 to provide to a user an indication whether a particular power adapter 16 is operable to provide power to enable operation of electronic device 10 and, if so, for operation of electronic device at a full performance level or a reduced performance level, in response to connecting the power adapter 16 to electronic device 10. Thus, embodiments of the present invention enable a user to easily identify whether a particular power adapter 16 is operable to power electronic device 10 and, if so, an indication of a performance level at which electronic device 10 may be operated without the user having to turn on or otherwise operate the electronic device 10.

What is claimed is:

1. An electronic device comprising:
   a power adapter port; and
   a performance level indicator operatively connected to the power adapter port and configured to determine an operational performance level for the electronic device based on a power capability of a power adapter coupled to the power adapter port of the electronic device at least while the electronic device is non-operational;
   where the performance level indicator is configured to receive a power signal from the power adapter, the performance level indicator comprising at least one circuit including a plurality of indicators where the at least one circuit functions to activate at least one indicator of the plurality of indictors using at least current from the power signal.

2. The electronic device of claim 1, wherein the performance level indicator is configured to indicate that the power adapter enables the electronic device to operate at a full performance level.

3. The electronic device of claim 1, wherein the performance level indicator is configured to indicate that the power adapter enables the electronic device to operate at a reduced performance level.

4. The electronic device of claim 1, wherein the performance level indicator is configured to indicate that the power adapter is unable to provide a level of power for operating the electronic device.

5. The electronic device of claim 1, wherein the performance level indicator comprises a light source.

6. The electronic device of claim 1, wherein the performance level indicator comprises a multi-color light source.

7. The electronic device of claim 1, wherein the at least one circuit of the electronic device functions to activate the at least one indicator without processing instructions from a processor.

8. An electronic device comprising:
   means for connecting to a power adapter and supplying power to the electronic device;
   means for determining an operational performance level for the electronic device based on a power capability of a power adapter means coupled to the means for connecting of the electronic device at least while the electronic device is non-operational;
   where the means for determining is configured to determine the power capability of the power adapter means by activating one or more indicators with at least current from a power signal received from the power adapter means.

9. The electronic device of claim 8, further comprising means for indicating that the power adapter means enables the electronic device to operate at a full performance level or a reduced performance level.

10. The electronic device of claim 8, where the means for determining is configured to determine the power capability of the power adapter means without executing instructions by a processor.

11. The electronic device of claim 8, further comprising at least one circuit operatively connected to the means for connecting of the electronic device, for visually indicating the operational performance level where the at least one circuit is not operatively connected to a processor.

12. The electronic device of claim 8, further comprising means for varying an illumination interval of an illumination means for indicating the operational performance level.

13. A performance level indicator method comprising:
   reading a signal received from a power adapter coupled to a port in the electronic device; and
   determining an operational performance level for the electronic device based on the signal activating an indicator in a circuit connected to the port at least while the electronic device is non-operational and where the activating does not execute instructions in a processor.

14. The method of claim 13, further comprising comparing the signal received from the power adapter to a value representative of a full operational performance level.

15. The method of claim 13, further comprising comparing the signal received from the power adapter to a value representative of a reduced operational performance level.

16. The method of claim 13, further comprising comparing the signal received from the power adapter to a value representative of a minimum power level for enabling operation of the electronic device.

17. The method of claim 13, further comprising visually indicating the operational performance level.

18. The method of claim 13, further comprising activating at least one light source representative of the operational performance level.

19. The method of claim 13, further comprising varying an illumination of a light source to indicate the operational performance level.

20. The method of claim 13, further comprising varying an illumination interval of a light source to indicate the operational performance level.

* * * * *